Sept. 15, 1953 R. CHILTON 2,652,192
COMPOUND-LEAD SCREW COMPRESSOR OR FLUID MOTOR
Filed June 13, 1947 9 Sheets-Sheet 1
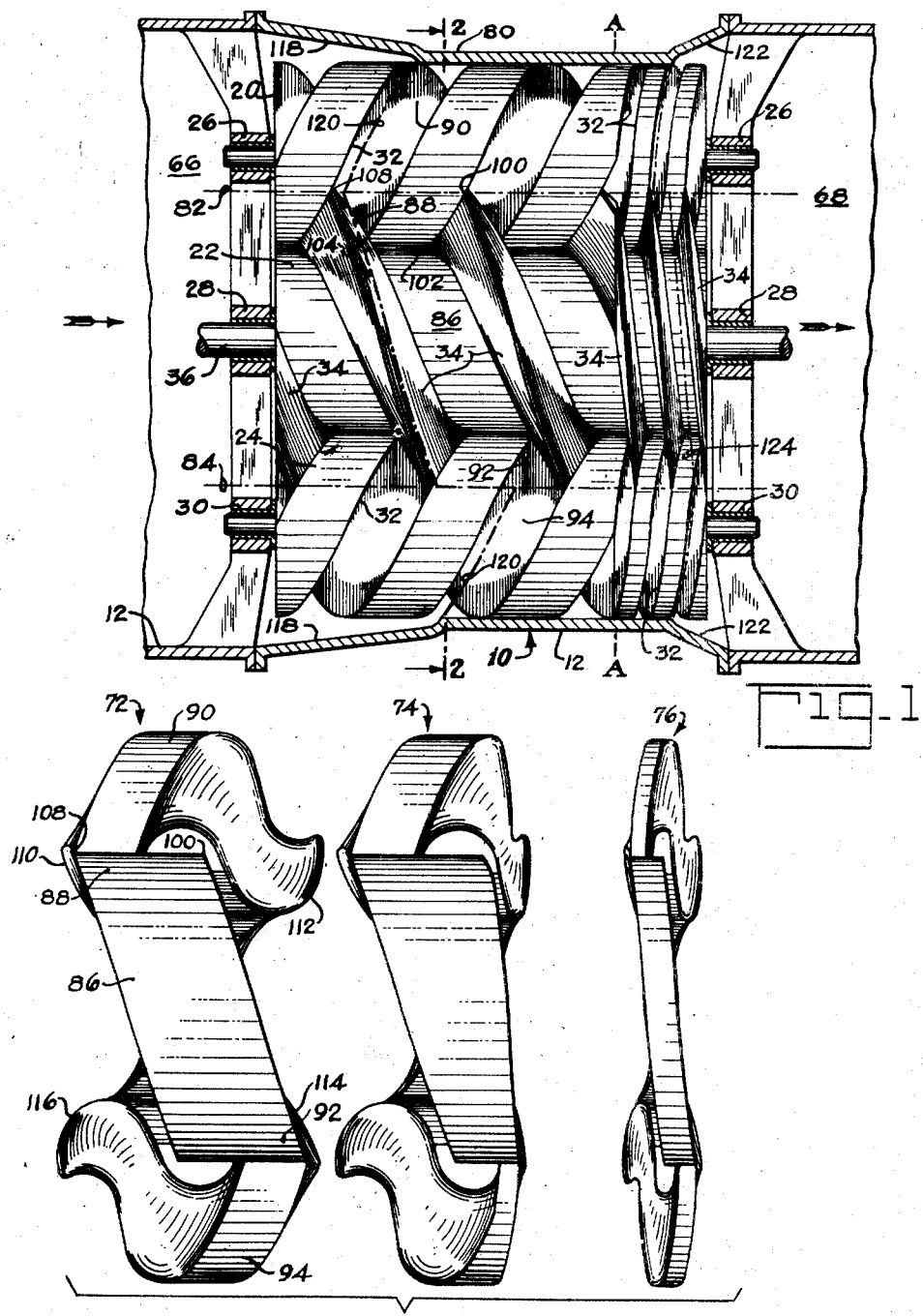
INVENTOR
ROLAND CHILTON
BY
ATTORNEY Sept. 15, 1953 R. CHILTON 2,652,192
COMPOUND-LEAD SCREW COMPRESSOR OR FLUID MOTOR
Filed June 13, 1947 9 Sheets-Sheet 2
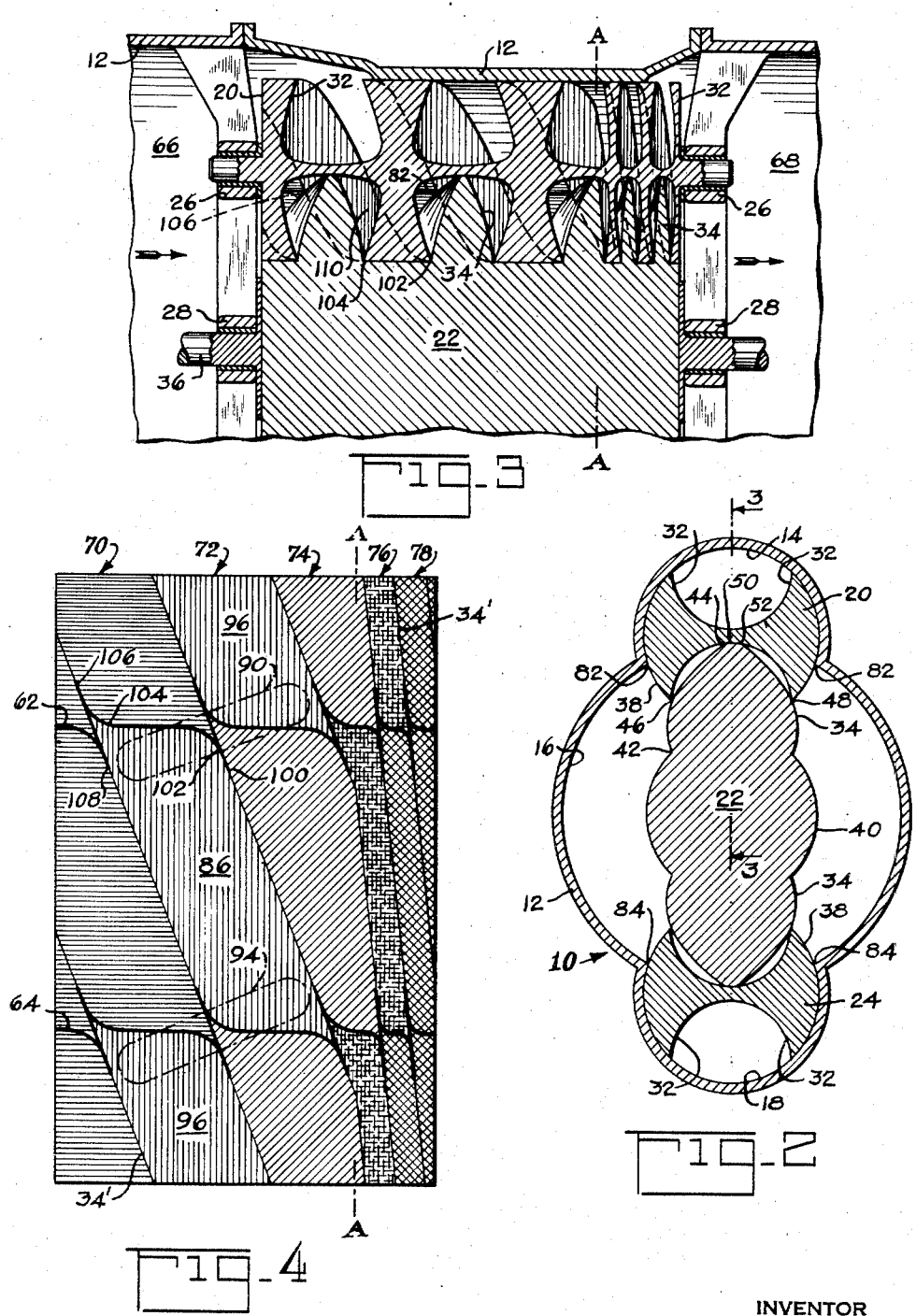
INVENTOR
ROLAND CHILTON.
BY
ATTORNEY Sept. 15, 1953 R. CHILTON 2,652,192
COMPOUND-LEAD SCREW COMPRESSOR OR FLUID MOTOR
Filed June 13, 1947 9 Sheets-Sheet 3
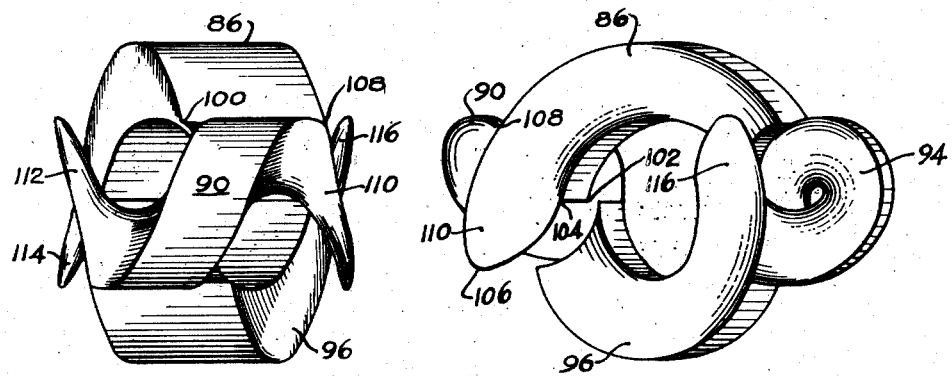
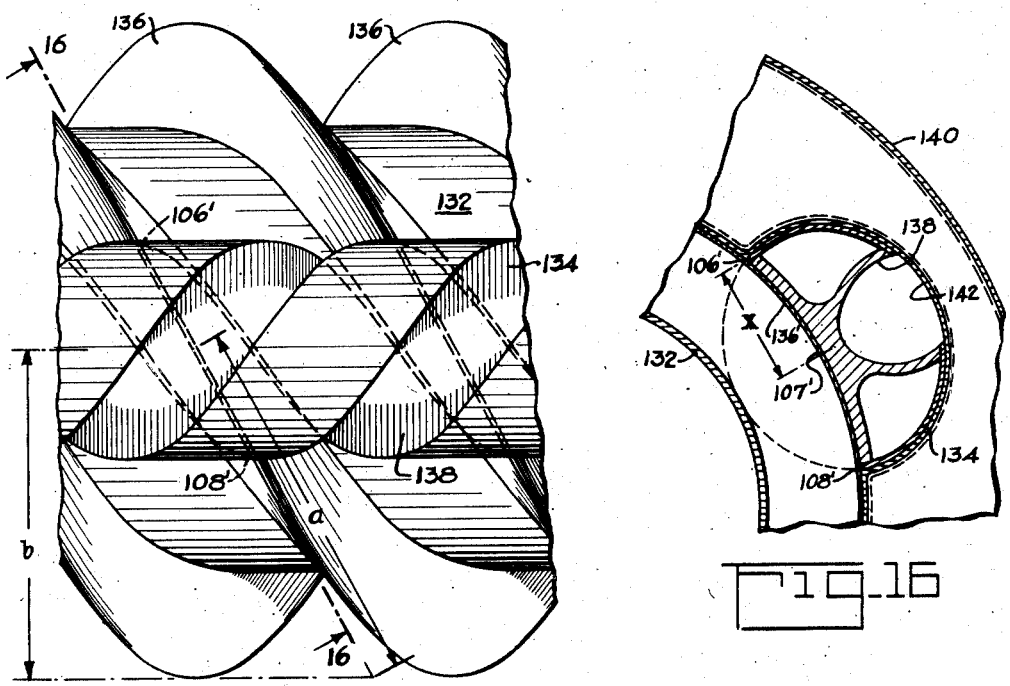
INVENTOR
ROLAND CHILTON.
BY
ATTORNEY

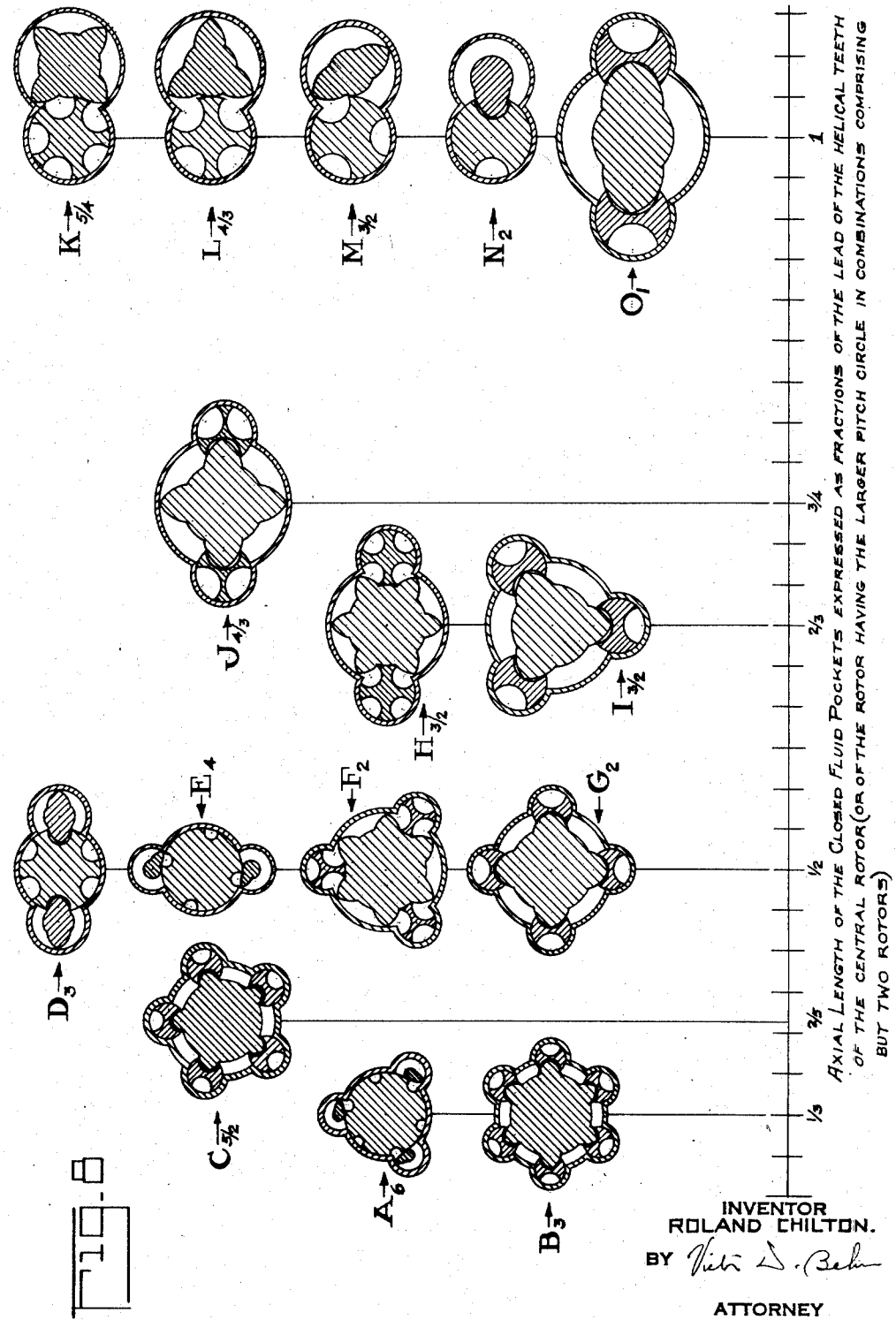

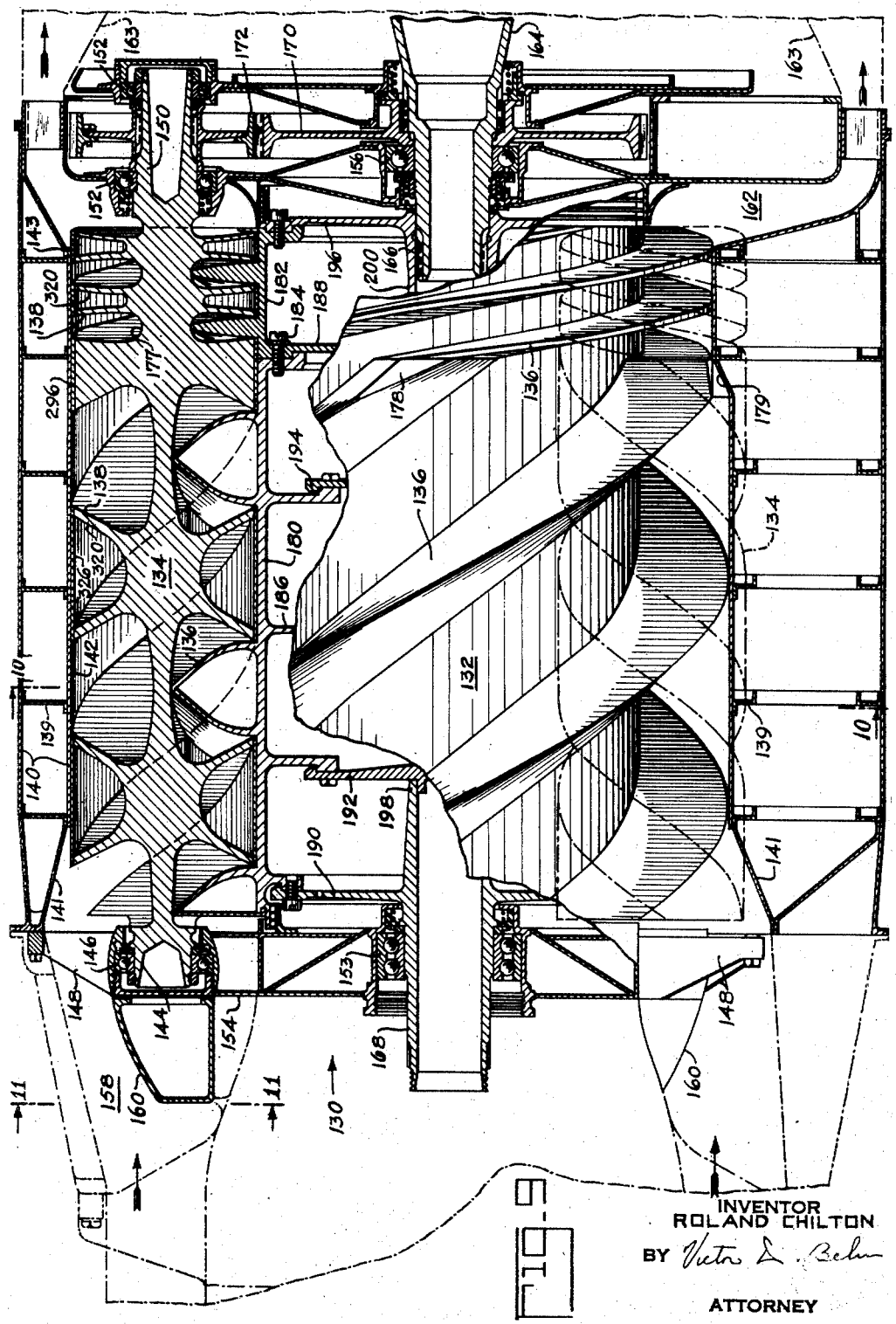

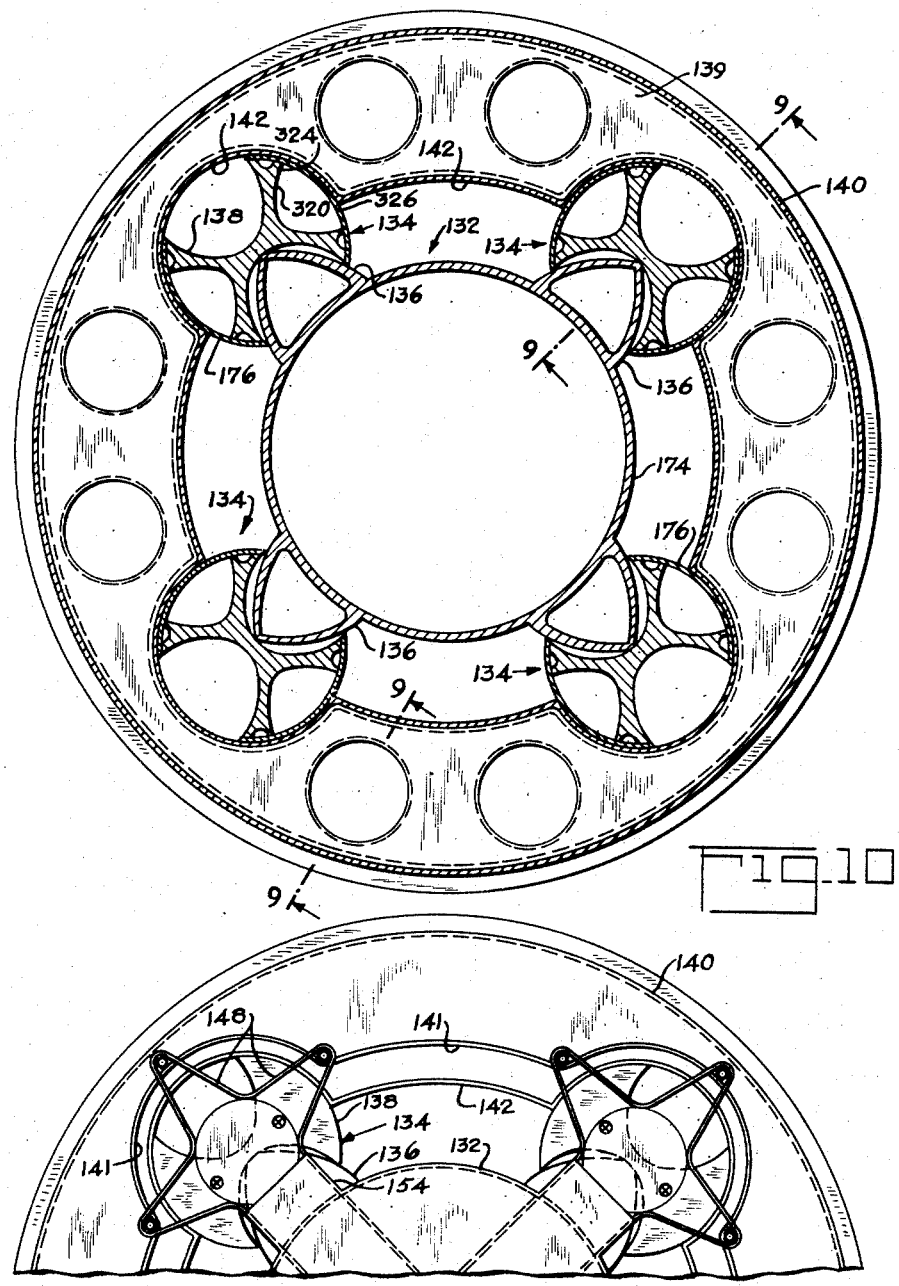

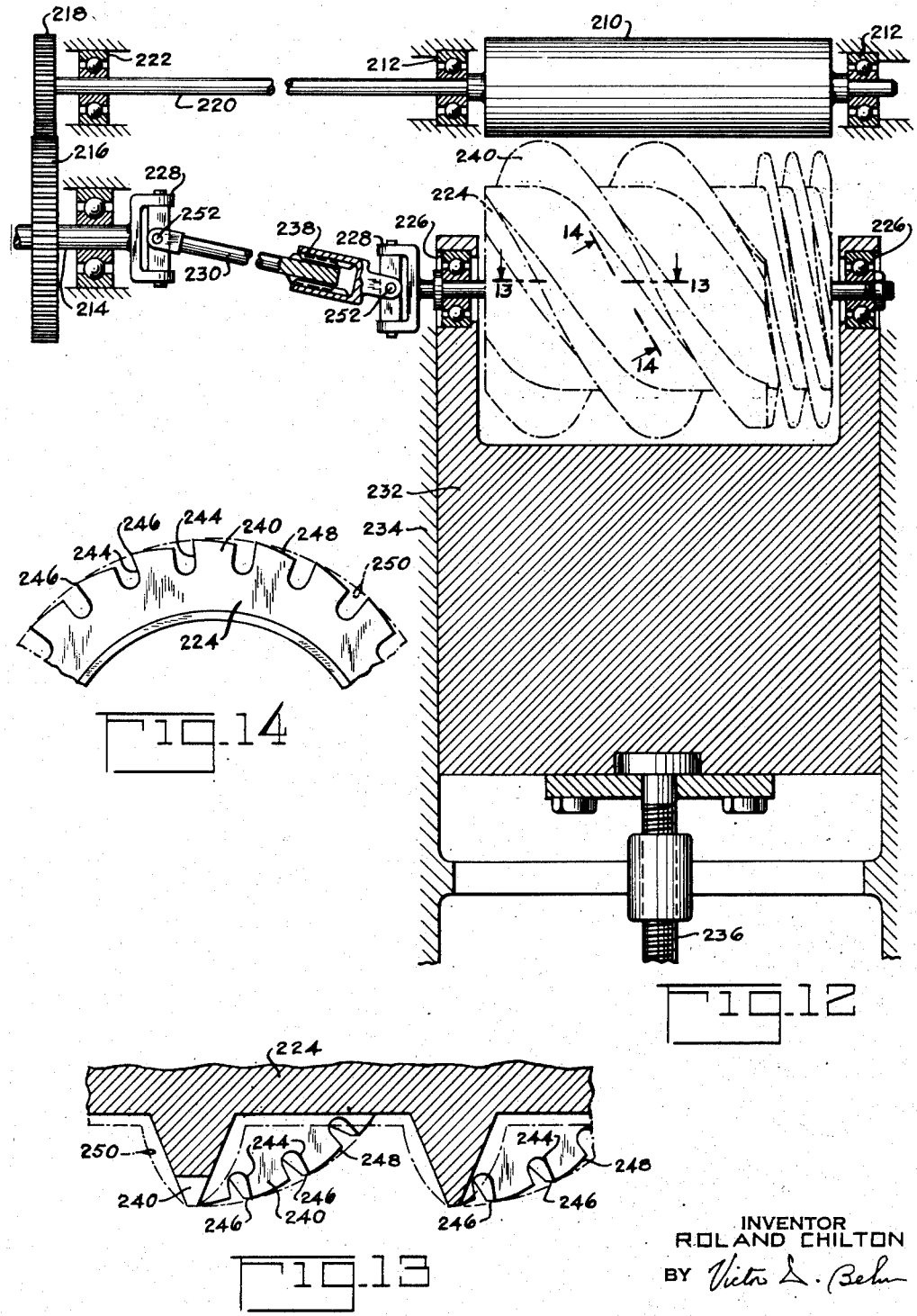

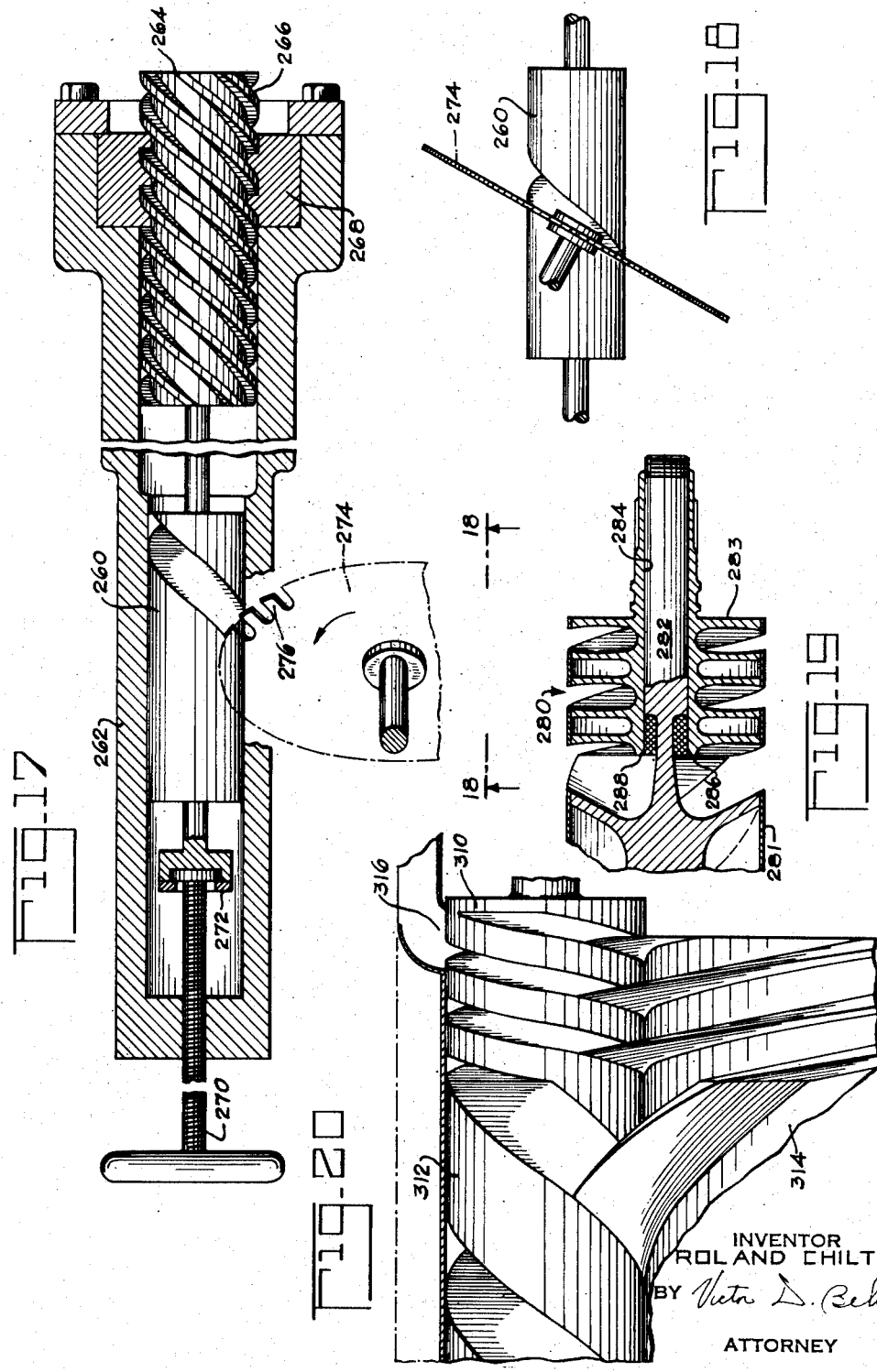

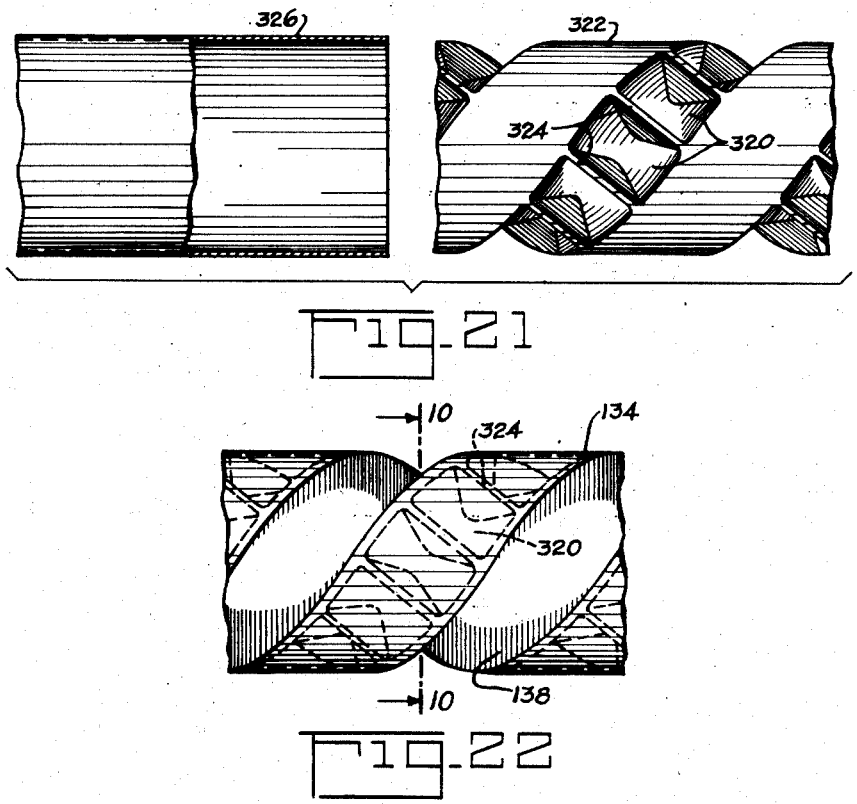

Patented Sept. 15, 1953

2,652,192

UNITED STATES PATENT OFFICE 2,652,192

COMPOUND-LEAD SCREW COMPRESSOR OR FLUID MOTOR

Roland Chilton, Ridgewood, N. J., assignor to Curtiss-Wright Corporation, a corporation of Delaware Application June 13, 1947, Serial No. 754,380

12 Claims. (Cl. 230—143)

This invention relates to rotary fluid motors and/or compressors and is more particularly directed to such machines in which, in the case of the compressor, the fluid is compressed within the machine and, in the case of the fluid motor, the pressure energy of a fluid is converted into mechanical energy by expansion of the fluid within the machine.

For convenience of discussion, a machine embodying the invention is described in terms of compressor operation but as will be obvious the machine may also be used as a fluid motor by supplying fluid under pressure to the high pressure end of the machine, the expansion of the fluid through the machine to its low pressure end driving the machine in the direction of rotation opposite to that for compressor operation.

In the prior art, compression within a machine has been obtained with screw-type compressors comprising a plurality of side-by-side rotors having meshing thread-like helical teeth. By compression within the machine is meant that the fluid is compressed therein prior to its communication with the compressor outlet or receiver. This is in contra-distinction to the operation of machines, such as a Roots-type blower, which provide positive displacement of the fluid but no compression until the fluid communicates with the machine outlet or receiver. However, in the screw-type compressors of the prior art, compression within the machine has been accomplished only by means of "timed" inlet and outlet ports. These prior art screw-type compressors include a housing and end walls closely fitted about the helically threaded rotors to form a plurality of fluid spaces between said housing, end walls, and rotors, the aforesaid timed ports being formed in said housing and end walls. Upon rotation of the rotors of such a prior art compressor, its inlet and outlet ports are successively covered and uncovered by the helical rotor teeth, thereby successively placing said fluid spaces into communication with said ports. After a particular fluid space is closed to the inlet port, continued rotation of the compressor results in movement of said space toward and against the housing end wall at the outlet end of the compressor and, as a result said space decreases in volume to compress its charge. With further compressor rotation, said fluid space is placed into communication with the outlet port whereby each said space successively delivers its compressed charge through said outlet port. Accordingly in these prior art screw-type compressors, compression within the machine has been obtained by providing timed inlet and outlet ports. This feature results in interrupted fluid flow with an accompanying loss in compressor efficiency. An object of this invention comprises the provision of a novel compressor of the screw-type, wherein compression is obtained within the machine but in which all the fluid spaces at the low pressure end of the compressor are continuously open to its inlet and all the fluid spaces at the high pressure end are continuously open to the compressor outlet.

The prior art also includes positive displacement pumps of the aforedescribed screw-type, in which, as in the Roots-type blower, there is no compression within the machine. Because of the lack of compression within the machine such positive displacement pumps have been termed "transporters" as distinct from compressors. In these screw-type transporters the fluid inlet is at one end of the rotor assembly and is continuously open to all the fluid spaces at this end. However, because screw-type compressors of the prior art, having compression within the machine, rely on timed inlet and outlet ports for said compression, it has heretofore been impossible, in such compressors, to have the compressor inlet and outlet continuously in communication with all the fluid spaces at the respective ends of the compressor.

Reference is hereinafter made to the "lead" of the helical teeth and the helical spaces therebetween of rotors of screw-type compressors. Unless otherwise specified, as herein used, the "lead" of such a helical tooth or space is equal to the axial length subtended by one complete helical turn of said tooth or space about its rotor axis.

As hereinafter described, if screw-type compressors are provided with certain combinations of number of rotors and number of helical teeth thereon, then the fluid spaces between the compressor housing and the rotors form closed pockets intermediate the rotor ends without the aid of walls across the ends of the rotors. Accordingly a still further object of the invention comprises the provision of a screw-type compressor having compression therein and having a combination of rotors and rotor teeth such that said closed fluid pockets are formed.

In accordance with the present invention the lead of the helical rotor teeth is decreased at the outlet end of the compressor whereby said pockets decrease in volume as they move toward said outlet end during compressor rotation, thereby compressing the fluid charge in each said pocket.

This compound-lead screw compressor eliminates the prior art requirement of timed ports to provide compression within the machine. With this arrangement the compressor fluid inlet and outlet can be continuously open to all the fluid spaces at their respective compressor ends according to one of the main objects of the invention. Instead of, or in addition to, changing the lead of the helical rotor teeth, it is possible to effect a reduction in the volume of said closed fluid pockets, as they approach the outlet end of the machine, by inclining the rotor axes relative to each other toward the compressor outlet and/or by decreasing the height of the rotor teeth toward said outlet.

In screw-type compressors having timed ports to provide compression within a machine, the inlet and outlet ports are positioned on opposite sides of the machine whereby the fluid flow therethrough is partly axial and partly circumferential about the outer or non-meshing portions of the rotors. In addition, in said prior art compressors the fluid entering the compressor is broken up into a plurality of isolated pockets which recombine prior to their discharge from the compressor. This chopping-up of each entering charge of fluid into isolated pockets causes turbulence and loss in compressor efficiency. In contrast to this operation of prior art screw-type compressors, with the present invention the fluid flows axially into the fluid spaces formed between the rotors and their housing and, upon rotation of the rotors, each charge of fluid becomes trapped within a single closed pocket, and progresses axially and without rotation through the machine.

Another advantage of the present invention arises from the fact that compression of a fluid results in a fluid temperature rise so that the outlet zone of a compressor operates at a higher temperature than its inlet zone. When the fluid flow is diagonally through the machine, as in the prior art screw-type compressors, there necessarily is a non-symmetrical temperature variation along and across the compressor housing. That is, in any transverse section of the compressor housing there will be a temperature variation around that section. However the compressor rotors, because of their rotation, will have a uniform temperature at any one transverse section. Accordingly, in prior art screw-type compressors, the difference in the temperature rise of the rotors and their housing results in relative distortion therebetween so that the clearance between the rotors and their housing must be sufficient to accommodate this distortion. With the machine of the present invention the fluid flow is axial and, as a result, the rotors and their housing have a uniform temperature all over any transverse section, which temperature increases progressively from the compressor inlet to its outlet. Accordingly, with the present invention, the rotors and their housing have substantially the same thermal expansion at each transverse section whereby the clearance therebetween may be held to a minimum in order to reduce compressor leakage.

The cross-sectional area available for flow through screw-type compressors is equal to the cross-sectional area of the fluid spaces between the rotors and their housing and the displacement of such machines is proportional to this area. With the present invention this entire area is available as flow area at the inlet and outlet ends of the compressor, whereas the timed inlet and outlet ports of the prior art necessarily are of much smaller area.

Other objects of the invention will become apparent upon reading the annexed detail description in connection with the drawing, in which:

Figure 1 is a view, in elevation, illustrating the rotors of a screw-type compressor embodying the invention with the compressor housing diagrammatically illustrated in section;

Figure 2 is a sectional view taken along line 2—2 of Figure 1;

Figure 3 is a sectional view taken along line 3—3 of Figure 2, with the rotors rotated slightly from their position in Figure 1;

Figure 4 is a diagrammatic developed view of the central rotor of Figure 1 and illustrating the closed fluid pockets;

Figure 5 shows views of the form of a closed fluid pocket prior to its compression, at an intermediate stage of compression, and at maximum compression respectively;

Figures 6 and 7 are side and top views of Figure 5 of the closed fluid pocket prior to its compression, Figure 6 being slightly in perspective;

Figure 8 is a pictorial graphical chart illustrating other compressor rotor combinations embodying the invention;

Figure 9 is a side view partly in section of the preferred embodiment of the invention with the parts in section taken along lines 9—9 of Figure 10 and with the part in elevation comprising a view of the central rotor between said sectional parts, a side rotor being superimposed on said central rotor by dot and dash lines so as not to obscure the teeth of said central rotor;

Figure 10 is a view taken along line 10—10 of Figures 9 and 22; Figure 11 is a view taken along line 11—11 of Figure 9;

Figure 12 is a schematic view of a hobbing machine for cutting the teeth of a dedendum rotor;

Figure 13 is a sectional view taken long line 13—13 of Figure 12, with an addendum rotor superimposed thereon by dot and dash lines;

Figure 14 is a view taken along line 14—14 of Figure 12;

Figure 15 is a partial view in elevation of a side rotor with its central rotor directly behind said side rotor;

Figure 16 is a sectional view taken along line 16—16 of Figure 15;

Figure 17 is a schematic view partly in section of another machine for cutting the teeth of a dedenum rotor;

Figure 18 is a view taken along line 18—18 of Figure 17;

Figure 19 is a sectional view of a modified form of side rotor for the combination of Figure 9;

Figure 20 is a partial view of a further modification of Figure 9 with the compressor housing in section and with the rotors in elevation;

Figure 21 is a view of a portion of cylindrical blank hollowed for the formation of hollow dedendum teeth together with a sleeve in position to be slid over said blank; and Figure 22 is a view in elevation of a portion of a dedendum rotor of Figure 9 illustrating the hollow rotor teeth.

Referring first to Figures 1 to 3 of the drawings, a screw-type compressor 10 is shown as comprising a housing 12, having three intersecting cylindrical chambers 14, 16 and 18 within which are disposed rotors 20, 22 and 24 respectively. The rotors 20, 22 and 24 are supported at each end by their resceptive bearings 26, 28 and 30, carried by the housing 12. The side rotors 20 and 24 are identical and are provided with helical teeth 32 meshing with helical teeth 34 of the central rotor 22. In addition the walls of the housing chambers 14, 16 and 18 are closely fitted over the outer edges of the teeth of said rotors so that the clearance between the outer edges of said teeth and their associated chamber walls is a minimum. According to a prime object of the invention and for reasons herein described, the lead of said helical teeth changes at the plane A—A indicated in Figures 1 and 3.

Although the lead of the rotor teeth changes at the plane A—A, the profile of each helical rotor tooth is made the same in any plane transverse to its rotor axis whereby said change in lead does not interfere with their meshing engagement. That is, the tooth profiles illustrated in Figure 2 are identical in any transverse plane along the rotors. In fact the only difference between transverse sections, through the rotor teeth, at different points along the rotor axes, is in the relative positions of the rotor teeth at said sections. Because the transverse profile of each said helical tooth is constant in transverse planes through said rotors, the normal thickness of each tooth and the normal width of each tooth space necessarily decreases with its decrease in lead as illustrated in Figure 1.

Power to drive the compressor may be supplied to a shaft 36 which, as illustrated, comprises an extension of the central rotor 22. The side rotors 20 and 24 may be driven through the meshing helical teeth of said rotors, but preferable, and particularly for large machines operated with no lubrication between the rotor teeth, timing gears may be provided (as illustrated in Figure 9) to insure proper timed rotation of the rotors with a minimum and controlled clearance between their meshing teeth.

Each side rotor 20 and 24 is provided with a double thread, that is with two helical teeth 32. In addition the profile of each tooth 32 is all dedendum, that is the entire portion of each tooth 32 is disposed inwardly of the pitch circle 38 of its associated side rotor 20 or 24. The central rotor 22 also has a double thread, that is, it has two helical teeth 34. However, the profile of each tooth 34 of the central rotor is all addendum, that is, the entire portion of each tooth 34 is disposed outwardly of the pitch circle 40 of the central rotor.

The profile of the rotor teeth 32 and 34 in planes perpendicular to the rotor axes is illustrated in Figure 2. The profile of a tooth 34 on the central or addendum rotor 22 between the points 42 and 44 is an epicycloid generated by the point 46 on the pitch circle 38 of the side rotor 20 as the pitch circles 38 and 40 roll on each other. Similarly the companion profile of this addendum tooth is an epicycloid generated by the point 48 on the pitch circle 38 of said side rotor 20. The profile of a tooth 32 on the dedendum rotor 20 between the points 46 and 50 is generated by the tip 44 of a tooth 34 on the central rotor as the pitch circles 38 and 40 roll on each other. The adjacent dedendum tooth profile, between the points 48 and 50 of the next dedendum tooth, is generated by the other tip 52 of said central rotor tooth as said pitch circles roll on each other. Since the points 44 and 52 are not on the pitch circle 40 but are at a fixed distance from the center of this pitch circle, the profiles of the dedendum teeth are epitrochoids. These tooth forms and variations thereof are conventional in the art of screw-type compressors.

When rotors having such tooth forms are disposed in meshing engagement there is a continuous or uninterrupted seal line between each pair of meshing rotors. That is, except for the small working clearance between the meshing helical teeth of a pair of rotors, fluid cannot pass between the meshing rotors anywhere along their length of meshing engagement. The seal lines between the central rotor 22 and the side rotors 20 and 24 are schematically indicated in Figure 4 by the two heavy lines 62 and 64 respectively. In Figure 4 the surface of the central rotor 22 has been developed or unfolded and the tips or apices of its helical teeth 34 have been indicated by diagonal lines 34'. The seal lines 62 and 64 are hereinafter more fully described. The plane A—A at which the lead of the rotor teeth changes is also indicated on Figure 4.

At this point it should be noted that the cylindrical surface portions of the central rotor 22 between its teeth 34, and the cylindrical surface portions of the side rotors 20 and 24, forming the outer surface of the teeth 32 of said side rotors, coincide with the pitch circles 38 or 40 of their respective rotors so that said surfaces roll together without slipping, whereby the clearance between said cylindrical rotor surfaces can be made zero to eliminate leakage over these zones. Also the present invention is not limited to the specific form of tooth profiles described, in connection with Figure 2, in which the teeth of one pair of meshing rotors are all addendum and the teeth of the other rotor are all dedendum. However, it is essential that the tooth profiles be such that a continuous seal line is formed between each pair of meshing rotors co-extensive with the entire length of their meshing engagement.

Fluid is supplied to the compressor housing 12 through its open inlet end 66 and this fluid is received within the fluid spaces between the walls of the housing chambers 14, 16 and 18 and their respective rotors 20, 22 and 24. With the combination of rotors and rotor teeth illustrated in Figures 1 to 3, fluid cannot flow directly from the compressor inlet 66 to its outlet 68 through said fluid spaces even though there is no housing end wall over any part of the outlet end of the rotors. With the central rotor in the position illustrated in the schematic view of Figure 4, the entire portion 70 of the fluid spaces, between the rotors and their housing, and indicated by the horizontal shade lines in Figure 4, is open to the inlet end of the compressor and closed to the compressor outlet. As the compressor rotates these fluid spaces progressively move toward the outlet end of the compressor. When a portion of this fluid space occupies the position indicated by the vertical shade lines in Figure 4 it is closed to the inlet end of the compressor as well as to the compressor outlet end. Such closed spaces are hereinafter termed fluid pockets and adjacent the compressor inlet said pockets are identified by reference numeral 72. The vertical shade lines of Figure 4 indicate only the area of the development of the portion of the closed fluid pocket 72 disposed about the central rotor 22. With continued rotation of the compressor, this pocket 72 moves axially and without rotation toward the outlet end 68 of the compressor. Thus, in moving through the compressor, a closed fluid pocket successively occupies the position of the pocket 72; the position of a pocket 74 (the extent of which about and along the central rotor 22 is indicated by diagonal shade lines in Figure 4); and the position of a pocket 76 (the extent of which about the central rotor is indicated by the horizontal and vertical criss-cross shade lines in Figure 4). With further rotation of the compressor rotors, the pocket 76 moves to the outlet end of the compressor into the positions of the spaces 78, indicated by diagonal criss-cross shade lines, which spaces communicate with the outlet end 68 of the compressor.

Figures 5, 6 and 7 illustrate the shape or form of a fluid pocket 72 adjacent the inlet end 66 of the compressor of Figures 1 to 3. Figure 5 also illustrates successive stages of such a pocket as indicated by the partially compressed pocket 74 and the substantially completely compressed pocket 76. The form or shape of a pocket 72 was determined by filling such a pocket with a suitable wax, for example by pouring melted wax through an opening in the wall of the housing 12 at a point such as 80. Upon solidification of the wax, the compressor was rotated in its reverse direction thereby discharging the molded wax form from the inlet end of the compressor (the rotor bearings 26, 28 and 30 at said inlet end having first been removed). In order to help make clear how the form or body illustrated in Figures 5 to 7 fits between the rotors and housing of Figure 1 and that the fluid pocket represented thereby is entirely closed, corresponding portions and points of a closed fluid pocket 72 in Figures 1, 2, 3, and 4 and the body 72 of Figures 5, 6, and 7 have been indicated by like reference numbers. Also in Figure 1 dot and dash lines 82 and 84 have been added to indicate the corners or junctions of the chamber 16 with the chambers 14 and 18 above the rotors, as viewed in this figure. These junctions 82 and 84 have been identified by similar reference numerals in Figure 2.

Referring now to Figures 1 to 7 inclusive, reference numeral 86 represents a space formed between a pair of adjacent addendum rotor teeth 34 on one side of the central rotor between its side rotors 20 and 24. One corner 88 of the space 86 opens into a dedendum tooth space 90 extending about the outer or unmeshing side of its associated rotor 20. The diagonally opposite corner 92 of the space 86 opens into a similar dedendum tooth space 94 extending about the outer side of the other side rotor 24. The presence of the lines 82 and 84 on Figure 1 representing the inner corners of the compressor housing above the corners 88 and 92 of the space 86 makes the communication between the space 86 and the spaces 90 and 94 clearly apparent in this figure. The other ends of the dedendum tooth spaces 90 and 94 communicate with diagonally opposite corners of a space 96 similar to the space 86 but disposed on the opposite side of the central rotor 22. The interconnecting dedendum tooth spaces 90 and 94 have been schematically superimposed on Figure 4 by dot and dash lines.

The outer edges of the fluid pocket 72 are sealed by the close fit between the walls of the chambers 14, 16, and 18 and the teeth of their associated rotors. Accordingly if there is a seal between the meshing portions of the teeth of the central or addendum rotor 22 and the teeth of the side or dedendum rotors 20 and 24, said pocket 72 will comprise a sealed fluid space except for leakage through the clearances between its relatively movable walls. Thus the line between the point 100, at the apex of an addendum tooth adjacent a housing corner 82, and the point 102 represents the contact or seal line along one side of an addendum tooth and the meshing edge of a dedendum tooth from the apex of said addendum tooth at 100 to its pitch circle at 102. The line between the points 102 and 104 represents the seal line between the cylindrical outer surface of said dedendum tooth and the cylindrical surface of the central rotor 22. As previously stated since the radii of said rotor surfaces are equal to that of their respective pitch circles, the clearance therebetween can be made equal to zero whereby there is no leakage across the sealing lines between such points as 102 and 104. The adjacent corner 88 of the space 86 opens into one end of the dedendum tooth space 90 as previously described. At this corner, the line of contact between the side of the adjacent addendum tooth and the meshing edge of a dedendum tooth extends to the rear of the plane of the sectioned portion of Figure 1. Thus this tooth contact or seal line extends rearwardly, from the point 104 on the pitch circle of said addendum tooth, up the side of said tooth to a point 106 (Figures 6 and 7) on its apex adjacent the rear corner 82, that is the corner 82 behind the plane of Figure 1. From the point 106 the seal or tooth contact line runs along the apex of said addendum tooth to the point 108 adjacent the forward corner 82, that is the corner 82 above said plane of Figure 1.

The seal line between the points 106 and 108 along the line of contact of an addendum tooth 34 and a dedendum tooth 32, is made clearer by reference to Figure 16 which illustrates a corresponding seal line 106' and 108' between a pair of different rotors. The seal line between the points 104 and 108 is represented on Figures 4, 5, and 6 by the outer edge of the thin projecting portion or increment 110, which portion fills the space indicated by the same reference numeral 110 in Figure 3. Thus the seal line extending through the points 100, 102, 104, 106, and 108 prevents free flow of fluid from the pocket 72 between the rotors 20 and 22.

The points 100 and 108 are corresponding points on the apex of adjacent addendum teeth 34 so that the seal line between the addendum rotor 22 and the dedendum rotor 20, between the points 100 through 108, is repeated between each pair of meshing rotor teeth as is schematically illustrated in Figure 4 by the continuous seal line 62. Obviously the seal line 64 between the addendum rotor 22 and the dedendum rotor 24 is similar to the seal line 62. Thus the other projecting portions or increments 112, 114, and 116 of the fluid pocket 72 are similar to the portion 110, and the outer edges of these projecting portions all represent a portion of the seal lines between the meshing rotor teeth of the addendum rotor 22 and the dedendum rotors 20 or 24.

Because of the decrease in lead of the rotor teeth at the plane A—A (Figures 1 and 4) said fluid pockets progressively decrease in volume as they move toward the compressor outlet thereby compressing their charges. This is schematically illustrated in Figure 4 and realistically in Figure 5 by the decrease in the axial length of the successive pockets 72, 74 and 76 as they approach the compressor outlet and before they communicate with said outlet. If the lead of the rotor teeth were constant then the shape and volume of each fluid pocket would not change as it moved axially through the machine. In fact, if each rotor tooth were provided with a constant lead equal to its lead at the compressor inlet, a solid form in the shape of a fluid pocket 72, such as illustrated in Figures 5, 6 and 7, could be fed axially into the machine upon rotation of the rotors and said solid form would move axially through the machine and could be discharged from its opposite end. Accordingly it is apparent that, in the compressor of Figures 1 to 3, the fluid pockets and their charges do not rotate but merely move axially through the compressor.

The operation of the compressor illustrated in Figures 1 to 3 may be summarized as follows: Upon rotation of the rotors, fluid flows axially from the compressor inlet 66 into the fluid spaces between the compressor rotors and the walls of its housing 12 and this fluid becomes trapped in successively formed pockets 72. These fluid pockets successively move axially toward the compressor outlet and, as indicated in Figure 5, the accompanying decrease in their volume, due to the change in lead of the rotor teeth, results in compression of their charges. After each fluid pocket attains its minimum volume, it is placed in communication with and delivers its charge to the compressor outlet 68. With this arrangement there is a continuous flow of fluid into and out of the inlet and outlet ends respectively of the compressor and, except for possible small amounts of local turbulence within each fluid pocket, the fluid trapped in said pockets flows axially through the compressor without any rotational motion. The rate of progression, through the compressor, of the fluid pockets and the air trapped therein, is equal to the lead of the addendum teeth forming said pocket multiplied by the rotational speed of the addendum rotor.

As illustrated the lead of the rotor teeth adjacent the compressor outlet 68 is approximately ¼ of the lead adjacent the compressor inlet 66. Accordingly the volume of said fluid pockets reduces to approximately ¼ of their original volume as they move from the compressor inlet toward its outlet end, thereby providing the compressor with a 4:1 volumetric compression ratio. Accordingly the ratio of the lead between the inlet and outlet ends of the machine depends on the volumetric compression ratio desired. Although the lead of the helical rotor teeth changes locally in the plane A—A, the volume of the fluid pockets changes progressively as they move axially through the machine, as should be apparent from Figures 4 and 5. It is not essential that the lead of the rotor teeth change locally or abruptly as illustrated. Instead there may be a gradual change in lead from one end of each rotor to the other. However, the provision of a local change in lead of the rotor teeth gives maximum compressor capacity within given overall compressor dimensions.

As schematically illustrated in Figure 4 a completely closed fluid pocket is formed substantially at the moment the downstream or leading end of the fluid therein enters the portion of the compressor in which the lead of the helical teeth is reduced, that is, as said downstream end reaches plane A—A of Figures 1 and 3. This mode of operation is termed "dead-point timing." Then upon further rotation of the compressor rotors, said fluid pocket enters the reduced lead portion of the machine whereupon the volume of this pocket begins to decrease thereby compressing its charge. The reduced lead or discharge end of the machine is just long enough that this fluid pocket attains its minimum volume before it opens its compressed charge to the outlet end of the compressor.

The point 108 and similar points of a fluid pocket 72 are the closest points to the compressor inlet of the sealing or contact line of said pocket between the inner surface of the compressor housing and the tips of the rotor teeth. However, the projecting spaces or increments 110 and 116 of a fluid pocket 72 extend upstream of these points between the rotor teeth and therefore to complete the seal about said increments, the rotors and their teeth also must extend upstream of points such as 108. Thus, the portion of the inner surface of the compressor housing fitted about the compressor rotors, may terminate short of the inlet end of the compressor rotors, thereby increasing the size of the compressor inlet as indicated at 118. Actually the upstream end of the inner surface of the compressor housing needed for sealing a newly formed fluid pocket 72 follows the edges of the adjacent rotor teeth as indicated by the dot and dash line 120 superimposed on Figure 1. Similarly the inner surface of the compressor housing fitted about the compressor rotors may terminate short of the outlet end of the compressor as indicated at 122 and like the upstream end 120 of this surface, its downstream end needed for sealing a fluid pocket follows the edges of the rotor teeth as indicated by the dot and dash line 124 also superimposed on Figure 1. Accordingly the lines 120 and 124 indicate the opposite ends of the housing surface fitted over the rotors above the plane of Figure 1.

In Figure 1, because the housing surface is cut back, as indicated at 118, the fluid space or pocket 72 is still in partial communication with the compressor inlet 66. However, with "dead-point timing" this communication is cut off as the downstream end of said pocket moves beyond the plane A—A.

In lieu of the "dead-point timing," previously described, the length of the compressor may be reduced to take advantage of the "ram" or velocity head of the entering fluid. For example, the upstream edge of the compressor housing may terminate short of the line 120 of Figure 1 and the compressor rotors may be shortened a corresponding amount so that the downstream portion of the air within a rotor fluid space, encounters the reduced lead portion of the rotor teeth before said space is completely closed to the compressor inlet. Then, because the downstream end of said space is slowing-up relative to the axial velocity of entering fluid, the ram effect from said axial fluid velocity is utilized to obtain a maximum charge within said fluid space.

It is essential, in the compound-lead screw compressor of this invention, that the individual fluid pockets form closed figures as illustrated in Figures 5 to 7, and this is obtained only with certain combinations and relations between the number of addendum and dedendum rotors and the number of teeth on the respective rotors. For example, assume the side rotor 24 to be eliminated and that the housing 12 is fitted about the remaining two rotors 20 and 22. Then the seal line 64 (Figure 4) is no longer present so that the dedendum tooth space 90 would connect an addendum tooth space above the seal line 62 to one below this seal line, which latter space would advance one turn around the addendum rotor to the upper side of the seal line 62, one addendum tooth advanced from its original starting point. Accordingly it is obvious that with one of the side rotors 20 or 24 eliminated no closed fluid pockets would be formed however long the rotors were made. Thus all combinations of rotors, having meshing helical teeth forming a continuous seal line therebetween, do not form closed fluid pockets, such as illustrated in Figures 5, 6 and 7. However, there is a large number of combinations of rotors and rotor teeth which do form closed fluid pockets in a manner similar to the combination illustrated in Figures 1, 2, and 3, wherein said closed fluid pockets are closed to the inlet and outlet ends of the compressor even though the ends of the compressor rotors are completely uncovered.

The axial length of such closed fluid pockets relative to the lead of the helical teeth will vary with the particular compressor rotor and rotor tooth combination. As is apparent from Figure 4, the axial length of a closed fluid pocket 72 is equal to the lead of the helical addendum teeth 34 plus an amount added by the projecting portions 110, 112, 114, and 116. For simplicity of discussion and unless otherwise stated, when reference is hereinafter made to the axial length of a closed fluid pocket, the added axial extent of projecting portions such as 110, 112, 114, 116 has been neglected.

Figure 8 is a pictorial graphical chart illustrating various combinations of rotors and rotor teeth in which closed fluid pockets are formed. In Figure 8, these combinations have been designated by the letters "A" to "O" inclusive and the subscript following each said letter is the ratio of the speed of rotation of the higher speed rotor or rotors, of its combination, to that of its lower speed rotor or rotors. This figure also illustrates the axial length of the fluid pockets, formed in the various combinations illustrated, said length being expressed relative to the lead of their associated helical teeth. With the axial length of the closed fluid pockets expressed in this manner, the lengths of said pockets, for different rotor combinations, may be directly compared regardless of the helix angle of their rotor teeth. The various combinations are illustrated by transverse sectional views similar to Figure 2 and as in Figure 2 the helical teeth on said rotors are either all addendum or all dedendum. Also to facilitate comparison of the various combinations illustrated in Figure 8 the diameter of the pitch circle of the rotor having the larger pitch circle has been made the same in all the combinations illustrated. It should be noted, however, that in combination O, which is identical to Figure 2, all the rotors have the same diameter pitch circle.

As disclosed in Figure 8, in combinations A and B, the closed fluid pockets have an axial length equal to ⅓ of the lead of the helical teeth of the central rotor. In combination C, the axial length of each fluid pocket is equal to ⅖ of the lead of the helical teeth of the central rotor. In combinations D, E, F, and G, the axial length of each fluid pocket is equal to ½ of the lead of the helical teeth of their associated central rotors. In combination J the axial length of each fluid pocket is equal to ¾ of the lead of the helical teeth of its central rotor. In combinations K, L, M, and N, the axial length of each fluid pocket is equal to the lead of the helical teeth of their associated rotors having the larger pitch circle. In combination O, which is identical to Figure 2, the axial length of each fluid pocket is equal to the lead of the helical teeth of the central rotor.

A rigorous mathematical determination of whether a particular combination of rotors and rotor teeth form said closed fluid pockets is quite complicated. However, from a study of various combinations, such as illustrated in Figure 8, it appears that with one central rotor having all addendum teeth, the following relation, between the number of dedendum rotors, the number of teeth on each dedendum rotor, and the number of teeth on the single addendum rotor, appears to be necessary in order to form said closed fluid pockets:

(1) $\quad T_a = (T_d \times N_d) - N_d$

In this formula, $T_a$ is equal to the number of teeth on the single addendum rotor, $T_d$ is equal to the number of teeth on each dedendum rotor, and $N_d$ is equal to the number of dedendum rotors. In each of these combinations considered, the axial length of the closed fluid pockets is equal to the ratio $$T_d/T_a$$

of the lead of the helical teeth of the addendum rotor, where $T_a$ and $T_d$ have the meaning already defined.

Similarly, in those combinations having a single dedendum rotor the following relation, between the number of teeth on each addendum rotor, the number of addendum rotors, and the number of teeth on the single dedendum rotor, appears to be necessary in order to form said closed fluid pockets:

(2) $\quad T_d = (T_a \times N_a) + N_a$

In this later formula, $T_a$ and $T_d$ are as above defined, and $N_a$ is equal to the number of addendum rotors. In each of the combinations considered, upon which formula No. 2 is based, the axial length of the closed fluid pockets is equal to the ratio:

$$\frac{T_a+1}{T_d}$$

of the lead of the helical teeth of the central rotor or the rotor having the larger pitch circle, where $T_a$ and $T_d$ have the meaning previously defined.

In combinations K, L, M, and N of Figure 8, in which there is but one addendum and one dedendum rotor, either of the above two sets of formulas is applicable.

The above formulas and pocket lengths have been determined by generalizing from a limited number of combinations such as illustrated in Figure 8, in which closed fluid pockets are formed and many other combinations which fail to form closed pockets were investigated. Accordingly applicant is not in a position to know from a rigorous mathematical analysis that every combination which satisfies Formulas 1 or 2 form closed fluid pockets or that every combination which does not satisfy one of said formulas does not form closed fluid pockets.

As above described, two equations are given setting forth the necessary relation between the number of rotors and the number of rotor teeth in order that said teeth form closed fluid pockets. Similarly two ratios have been given for determining the axial lengths of said pockets, one of said equations and one of said ratios being for those rotor combinations in which the central rotor has all-addendum teeth and the other of said equations and ratios being for those rotor combinations in which the central rotor has all-dedendum teeth. Said two equations may be generalized into the following single equation:

$$T_c = (T_s \times N_s) - N_s(1 - 2A)$$

and said two ratios may be generalized into the following single ratio:

$$\frac{T_s + A}{T_c}$$

In both said equation and ratio $T_c$ is equal to the number of teeth on the single central rotor, $T_s$ is equal to the number of teeth on the other rotors, $N_s$ is equal to the number of said other rotors and $A$ is a factor which is equal to zero or unity depending on whether said single rotor has all addendum teeth or all-dedendum teeth respectively. In order to determine whether a combination of but two rotors forms closed fluid pockets, either rotor may be assumed to be the central rotor in said equation and if said combination satisfies the equation then the value of said pocket length, as determined from said ratio, is expressed in relation to the lead of the helical teeth on said assumed central rotor.

The necessary axial length of the compressor, for a given capacity, is less in those rotor combinations in which the closed fluid pockets have the shorter axial lengths as in combinations A and B. However, in combinations A and B the speed of rotation of the side rotors is quite high compared to that of the central rotor, thereby limiting the permissible speed of the central rotor. For example: In combination A of Figure 8, the side rotors have a speed equal to six times that of the central rotor. In combination G, Figure 8, the speed of rotation of the side rotors is equal to only twice that of the central rotor and at the same time the axial length of its closed fluid pockets is only ½ the lead of the teeth of the central rotor. In general, the capacity of this type of compressor per revolution is equal to the lead times the end area, independently of whether the rotor and housing length required is as long as the lead or only a fraction such as one half and, in the latter case, the weight of the machine for given capacity is reduced to one half. In fact, for the compressor of a particular aircraft gas turbine power plant, combination G of Figure 8 appears to have an optimum combination of tip velocity of rotor teeth, compressor capacity, and compressor weight. A compressor embodying this preferred combination is illustrated in detail in Figures 9, 10, and 11. Obviously, however, the invention is note limited to combination G of Figure 8, since many other combinations may be used as is evident from this figure.

As indicated on Figure 8, in combination G, the axial length of a closed fluid pocket is equal to ½ the lead of the teeth of its central rotor. As previously stated this neglects the axial sealing increments such as designated 110, 112, 114 and 116 in Figures 5 to 7 (combination O of Figure 8). However, in combination G of Figure 8 the maximum axial length of such pocket increments is only ⅙ the lead of the teeth of the addendum rotor.

Referring now to Figures 9 to 11, the compressor 130 there illustrated has been designed to provide compressed air for an aircraft gas turbine power plant. The compressor 130 comprises a single central rotor 132 with four side rotors 134 equally spaced about said central rotor. The central rotor has four helical addendum teeth 136, the lead of which decreases locally adjacent the outlet end of the compressor, and the side rotors each have two helical dedendum teeth 138 meshing with said addendum teeth. The rotors 132 and 134 are disposed within a rigid housing structure 140 forming the compressor housing and comprising inner and outer walls connected by transverse annular bulkheads 139. As in Figures 1 to 3, the inner surface 142 of the compressor housing is closely fitted over the outer edges of the rotor teeth as best seen in Figure 10. However, as described in connection with Figures 1 to 3, for a short distance adjacent the compressor inlet and outlet ends, the compressor housing wall is not needed for sealing the fluid spaces between the rotor teeth. Thus, in Figure 9 advantage is taken of this fact to increase the compressor inlet opening by diverging the adjacent end of the compressor housing wall 142 toward its inlet end as indicated at 141. In addition the outlet opening of the compressor is increased by terminating the inner housing wall 142 short of the outlet end of the compressor rotors as indicated at 143. Preferably the ends of the inner surface 142 of the compressor housing conforms to the edges of the rotor teeth in a manner similar to the lines 120 and 124 of Figure 1.

At its inlet end, each side rotor is provided with a shaft extension 144 journaled within a bearing 146 carried by the housing structure 140 through suitable arms 148. Similarly the outlet end of each side rotor is provided with a shaft extension 150 journaled within bearings 152 also carried by said housing structure. In addition the central rotor 132 is supported at its inlet end by a bearing 153 carried from the housing structure 140 through arms 154 and is supported at its outlet end by a bearing 156 also carried by said housing structure. The housing structure 140 also provides an annular inlet duct 158 for the compressor 130 and stream-lined caps 160 are disposed in front of the side rotor bearings 146 to provide for smooth air flow thereover into the compressor. At the opposite or rear end of the compressor, the compressed air is discharged into an annular outlet duct 162 from which it is supplied to the combustion chamber or chambers 163 for a gas turbine (not shown).

The central rotor 132 is arranged to be driven by said turbine by a shaft 164 splined to said rotor at 166. In addition the front end of the central rotor may be provided with a forwardly extending shaft 168 for driving connection to an aircraft propeller. The compressor drive shaft 164 is also drivably connected with a central gear 170 which meshes with gears 172 splined to each side rotor shaft extension 150. The pitch circles of the gears 170 and 172 coincide with the pitch circles 174 and 176 of the addendum and dedendum rotors 132 and 134 respectively, whereby said gears maintain the rotors in properly timed relation with a minimum of clearance between their meshing teeth 136 and 138. In this way the rotors 132 and 134 may be operated with little or no rubbing friction between their meshing teeth thereby permitting high speed operation. Obviously, however, the timing gears 170 and 172 are not essential to the operation of a compressor embodying the present invention since, in the absence of such gears the rotor teeth 136 and 138 would serve as a drive between the rotors.

In Figures 9 to 11 the ratio of the diameter of the pitch circle 174 to that of the pitch circle 176 is 2:1 so that the side or dedendum rotors rotate at twice the speed of the central or addendum rotor. In the machine illustrated Figures 1 to 3 the side and central rotors rotate at the same speed, the ratio of their pitch circles being 1:1. However the operation of the compressor 130 essentially is the same as that of the compressor 10. Upon rotation of the compressor 130 air enters axially, from the inlet duct 158, into the fluid spaces between the compressor rotors and the housing wall 142. This air becomes trapped in closed fluid pockets, the volume of which decreases as said pockets move toward the compressor outlet because of the decrease in lead of the rotor teeth adjacent said outlet. When said fluid pockets attain their minimum volume they discharge their compressed air charges into the outlet duct 162.

The profile of the dedendum rotor teeth 138 is such that the helical grooves therebetween extend inwardly to the rotor axis as far as strength considerations permit in order to provide maximum compression capacity. For a given depth of dedendum teeth, the dedendum rotor is considerably stronger and more rigid at its inlet portion because the dedendum teeth are wider and have a larger helix angle along this portion of said rotor as compared to the width and helix angle of the dedendum teeth along the outlet or reduced lead portion of the rotor. The outlet or reduced lead portion of the dedendum rotor may be strengthened by decreasing the depth of the dedendum teeth along this portion of said rotor thereby increasing the root diameter of the teeth of said dedendum rotor along said outlet portion as indicated at 177 (Figure 9). This necessitates a corresponding reduction in the height of the addendum teeth, as indicated by their reduced outer diameter at 178, the inner surface 142 of the compressor housing being shaped to conform thereto as indicated at 179. This reduction in the height of the addendum teeth and depth of the dedendum teeth occurs just prior to their decrease in lead so that said dedendum teeth have their minimum depth throughout their reduced lead portion. This feature is not part of the present invention but is the invention of another. It should also be noted that the decrease in the height of the addendum teeth and depth of the dedendum teeth at the outlet end of a compressor, decreases the outer diameter of the closed fluid pockets at this end of the compressor and that, by itself, this change in tooth form increases the volumetric compression ratio of the compressor which may be compensated for by an increase in lead of the rotor teeth.

For convenience of fabrication, the central addendum rotor 132 is split into two sections 180 and 182 along the transverse plane at which the lead of its teeth changes, said two parts being secured together by screws 184 to form a composite cylindrical drum. This composite cylindrical drum is provided with complete transverse bulkheads 186 and 188, each formed integral with one of the two drum sections 180 and 182 as well as with additional transverse bulkheads 190, 192, 194 and 196, secured to internal annular flanges on said rotor drum. In addition an extension of the shaft 168 at the inlet end of the compressor is provided with an inverted pilot support with the adjacent bulkhead 190 as indicated at 198, and a bulkhead extension 200 at the outlet end of the compressor is provided with a similar inverted pilot support with the adjacent bulkhead 188.

The addendum teeth on the central rotor drum portion 180 are made hollow to lighten said rotor, but on the central rotor drum portion 182 said addendum teeth become quite thin and therefore may be made solid as illustrated. The hollow helical teeth on the central rotor drum portion 180 may be formed similar to the method of forming hollow helico-spiral teeth as disclosed in applicant's copending application Serial No. 723,738, filed January 23, 1947, now Patent No. 2,603,412, dated July 15, 1952. As disclosed in said copending application the hollow teeth are formed by first machining a blank (cylindrical in the present case) to form a rotor drum having spaced fin-like flanges extending radially therefrom. Then the tips of adjacent pairs of said flanges are bent together to form a hollow helical tooth, said tips being secured together as by welding. The hollow helical addendum teeth 136 are then completed by finish machining the side walls to the proper profile—for example, by means of a form cutter shaped to said profile or by any other conventional method for forming epicycloidal teeth. This construction of the central rotor provides a light-weight rotor structure which is also strong and rigid. If the addendum teeth are solid, as at the high pressure end of the rotor 132, the entire helical space between the teeth may be cut by any of said machining methods.

As previously described in connection with Figure 2, the profile of the teeth of the dedendum rotors are generated by the corners of the apices of the teeth of the meshing addendum rotor, as said rotors roll in mesh with each other. With this form of dedendum tooth, the apex of each generating addendum tooth is at a substantial distance from the pitch circle of its associated rotor, and therefore said generating corners always have a substantial velocity relative to the adjacent surfaces of the dedendum teeth meshing therewith as said addendum and dedendum teeth rotate relative to each other. Because this relative velocity of said generating points is quite large along the entire profile of the dedendum teeth, it is possible, according to this invention, to fabricate the dedendum rotor by cutting its teeth from a cylindrical blank by means of a hobbing machine in which the hob is rotated parallel to and fed radially into the cylindrical blank and in which the cutting edges of said hob have substantially the same profile as the apices of the addendum rotor teeth designed to mesh with the teeth of the dedendum rotor to be cut. It is not possible to use this same method to cut the addendum teeth because the generating points of the addendum teeth profiles are the outer corners of the dedendum teeth, which corners are on the pitch circle of the dedendum rotor. Accordingly the relative motion between said latter generating corners and the addendum teeth generated thereby is zero at the pitch circle of the addendum rotor.

Figures 12 to 14 schematically illustrate a hobbing machine for cutting the dedendum teeth 138. As will appear, the teeth of any other dedendum rotor may be cut in a similar manner. As illustrated a cylindrical blank 210, journaled in fixed bearings 212, is arranged to be driven from a shaft 214 through gears 216 and 218 and a long shaft 220 journaled in a fixed bearing such as 222. A hob 224 is journaled parallel to the blank 210 in bearings 226, and is drivably connected to the shaft 214 through suitable universal couplings 228 and a long shaft 230. The hob bearings 226 are mounted in a carriage 232 slidable in a fixed guideway 234 toward and away from the blank 210—for example, by means of a feed screw 236 having a push-pull connection with the carriage 232. The guideways 234 are rigid with the housing for the bearings 212 and are perpendicular to the axis of the blank 210 so that the hob 224 always remains parallel to said axis. To accommodate the foreshortening of the shaft 230 between its universal couplings 228, as the carriage 232 moves radially toward the blank 210, a spline joint 238 is provided.

The hob 224 comprises a cylindrical drum having helical cutting teeth 240 thereon, each helical cutting tooth having a relatively large lead portion and a much shorter lead portion identical with the leads of the addendum teeth 136. In addition the height of the helical hob teeth 240 is deceased at their reduced lead portion just as the height of the addendum teeth 136 is decreased on the actual rotor 132 at 178. Each cutter tooth 240 is provided with a series of recesses 244 providing cutting edges 246 and preferably each tooth is relieved slightly behind each cutting edge as indicated at 248. The width and radius of the cutting edges 246 is identical to the width and radius of each addendum tooth 136 at its apex but elsewhere, to afford clearance, the cutter teeth 240 are formed so as to be narrower at all points than the corresponding addendum teeth and the cylindrical surface of the hob 224 has a diameter smaller than the diameter of the cylindrical surface of the addendum rotor. This construction of the hob 224 is illustrated in Figures 13 and 14 in which a longitudinal section through the rotor is superimposed, by means of dot and dash lines 250 on a longitudinal sectional view through a portion of the hob 224. The hob teeth illustrated are for a roughing cut. The finishing hob will have fine teeth like a gear shaving cutter.

The hobbing machine gears 216 and 218 insure rotation of the blank 210 and hob 224 at the proper fixed speed ratio which is the ratio of the speed of the dedendum rotors 134 to the speed of their meshing addendum rotor 132. In Figure 9 this speed ratio is 2:1 so that with the hobbing machine designed to cut the dedendum teeth 138 of a rotor 134, the gears 216 and 218 are such that the blank 210 rotates twice as fast as the hob 224. With the blank 210 and hob 224 driven at the proper speed ratio, the hob is plunged radially and slowly into the blank by the feed screw 236 whereupon all the dedendum teeth 138 are simultaneously cut in said blank 210.

It is necessary that the universal couplings 228 be such that the angular velocity ratio of the blank 210 to the hob 224 remains fixed as the carriage 232 moves. When, as illustrated, conventional Hook's-type universal couplings are used, this constant angular velocity ratio may be provided by disposing the universal coupling pivot pins 252 parallel to each other. Obviously, however, other types of universal couplings may be used to maintain this velocity ratio constant, as for example an Oldham coupling.

In lieu of the aforementioned hobbing machine another unique method and apparatus may be used for cutting the dedendum teeth. For convenience, reference is first made to the dedendum rotor 20 since the contact or seal line between said rotor and the meshing addendum teeth 22 has already been discussed. As previously mentioned, the helical apex of an addendum tooth 34 contacts or is disposed in minimum clearance relation with the side walls of a dedendum tooth 32 between points such as 106 and 108, see Figures 1, 4, 5, 6, and 7. The length of each such helical contact or sealing arc, along the apex of an addendum tooth, is relatively small so that for all practical purposes this arc lies in a plane inclined to the axes of the rotors at the helix angle of the apex of the addendum teeth. By the "helix angle" of a helix is meant the angle whose tangent is equal to the lead of said helix divided by the circumference of the cylinder on which said helix is described.

Referring now to Figures 15 and 16, which are directed to the modification shown in Figures 9 to 11, Figure 15 is a view in elevation of a portion of a dedendum rotor 134 with its addendum rotor 132. In Figure 15 the apex of an addendum tooth 136 is in close or sealing contact with a tooth 138 of the dedendum rotor between the points 106' and 108', just as in Figures 1 to 3 the apex of an addendum tooth 34 and the meshing dedendum tooth 32 are in close or sealing contact along the line between the points 106 and 108. Figure 16 is a sectional view taken along line 16—16 of Figure 15. As illustrated in Figures 9 and 10 the teeth 136 are hollow so that only the tips 136' of said teeth appear in the section of Figure 16. As indicated, the plane of Figure 16 is substantially tangent to the helical apex or tip of an addendum tooth 136 and therefore the plane of Figure 16 is inclined to a plane transverse to the axes of the rotors substantially at the helix angle of the apex of the addendum teeth 136. Because the length of the seal or contact arc between the points 106' and 108' is small, this arc will lie substantially in the plane of Figure 16. In addition this arc is an ellipse since it is the intersection of the plane of Figure 16 with the cylindrical envelope of the addendum teeth 136. Thus the elliptical arc, on the dedendum rotor 134 between the points 106' and 108', forms a smooth continuation of the inner housing surface 142 across the corners of the portion of said surface fitted about said dedendum rotor. However, the arc between the points 106' and 108' is only a small portion of the complete ellipse so that it is possible to find a circular arc which for all practical purposes coincides with this elliptical arc. Therefore, the dedendum teeth 138 may be cut from a cylindrical blank by a plane circular saw having a circular periphery approximating that of the elliptical arc between the points 106' and 108', with the saw disposed at the helix angle of the addendum teeth which are to mesh with said dedendum teeth and with the width of the cutting edge of the saw equal to the width of the apex of said addendum teeth.

Because the curve between the points 106' and 108' is a helical arc, it deviates slightly from a plane curve. This deviation is not visible in Figure 15 since said arc is small. However, because of this deviation, the plane of the circular cutter preferably makes an angle slightly larger than said helix angle with a plane transverse to the rotor axis. For example the angular disposition of said cutter may coincide with a plane normal to Figure 15 and passing through the points 106' and 108'.

Apparatus for cutting the dedendum teeth 138 by this latter method is schematically illustrated in Figures 17 and 18. With this method it is necessary to split the rotor at the plane at which the lead of its teeth changes since otherwise as the cutting saw approached this plane it would attempt to cut teeth of the same lead on both sides of said plane. Obviously the dedendum teeth of the rotors 20 and 24 in Figures 1 and 3, or the teeth of any other dedendum rotor, may be cut in a similar manner.

In Figures 17 and 18 a cylindrical blank 260 is slidably and rotatably mounted in housing 262 and one end of said blank is secured to a cylindrical drum 264 having helical threads 266 of the same lead as the helical dedendum teeth to be cut in said blank. The helical drum 264 is threaded in a nut 268 fixed in the housing 262. In addition a feed screw 270, threaded in the housing 262, is provided with a push-pull connection 272 to the blank 260. A plane circular cutter 274 is mounted in suitable bearings in the housing 262 with the cutter rotatable through a clearance slot provided in said housing. The cutter 274 is disposed so that its plane is substantially at the helix angle, relative to the axis of the blank 260, of the addendum teeth 136 intended to mesh with the dedendum teeth to be cut—for example, the plane of said cutter may include the points 106' and 108'. In addition the cutter 274 is sufficiently close to the axis of the blank 260 to cut the entire profile of the dedendum teeth as the blank moves axially along and rotates about its axis.

The operation of the apparatus of Figures 17 and 18 is as follows: The blank 260 is positioned axially so that the cutter 274 is beyond one of the ends of the blank—for example, the right end in Figures 17 and 18. Then as the cutter is driven counter-clockwise (Figure 17) the blank is moved to the right on the helical threads 266 into the path of the cutter teeth 276, whereupon the helical groove forming one side of each dedendum tooth 138 is cut in the blank 260. Upon completion of this groove, the other groove on the dedenum rotor is cut in the same manner, each dedendum rotor having two dedendum teeth 138 thereon. This second groove starts at 180° opposite to the first groove and for this purpose means may be provided to correspondly index the fixed nut 268 before cutting the second groove.

The rate at which each helical dedendum groove is cut by the cutter 274 is determined by the rate at which the operator feeds the blank to the right by means of the screw 270. Also with this method, within practical limits, the cutter 274 can rotate at any desired speed relative to the movement of the blank 260. In addition although the cutter has been illustrated as having a flat disc-like structure, this is not essential since the body of the cutter inwardly of its cutting edges may be made heavier as long as it does not interfere with the cut. Thus, with the width of the cutting edge of the saw equal to the width of the apex of the addendum teeth 136, the remainder of the saw may have any width within the profile of said addendum teeth 136.

The diameter of the circular saw 274 may be determined from the theoretical curvatures of the ellipse at its points 106' or 108' and the curvature at the midpoint 107', said latter point being at one end of the minor axis of the ellipse. Thus at the point 107' the radius of curvature ($r_1$) of the ellipse is equal to $$r = \frac{a^2}{b}$$

where $a$ is the length of the semi-major axis of the ellipse and $b$ is the length of the semi-minor axis of the ellipse. These lengths have been indicated on Figure 15. The radius of curvature ($r_2$) at the points 106' or 108' is equal to $$r_2 = \frac{\left[a^2 - x^2\left(1 - \frac{b^2}{a^2}\right)\right]^{3/2}}{ab}$$

where $a$ and $b$ have the meaning previously defined, and $x$ is equal to the perpendicular distance of the point 106' or 108' from the minor axis of the ellipse as indicated on Figure 16. The difference between the radii of curvatures $r_1$ and $r_2$ is not very large so that if the radius of the cutter 274 is made equal to the average of $r_1$ and $r_2$ or to some other radius intermediate the values of $r_1$ and $r_2$ the periphery of the cutter can be made to closely approximate the elliptical arc between the points 106' and 108'. For example the radius of the periphery of the cutter may be such as to correspond to that of a circular arc passing through the points 106', 107' and 108'.

As discussed in connection with Figure 9, the outlet or reduced lead portion of each dedendum rotor is strengthened by decreasing the depth of their teeth along its said outlet portions. In addition to or in lieu of this reduction in the depth of the dedendum teeth, said outlet portion of each dedendum rotor may be strengthened by a cylindrical disc 310 rigid with and disposed across the outlet end of each dedendum rotor 312 as illustrated in Figure 20. The discs 310 close off a portion of the discharge opening of the compressor by closing the axial discharge openings at the ends of the dedendum rotors. However as illustrated in Figure 20, the outlet end of each dedendum rotor 312 is extended downstream of the central addendum rotor 314 to increase the radial discharge opening 316 of the dedendum rotors 312. Preferably the length of the dedendum rotors is increased to such an extent that the increase in their radial discharge opening makes up for the closure of their axial discharge opening by the discs 310. In Figure 20, the depth of the dedendum and addendum teeth is constant throughout their lengths and except for the increased length of the dedendum rotors, the compressor of Figure 20 is otherwise similar to the compressor of Figures 9 to 11.

At this point it should be noted that the plunge cut hobbing method of Figures 12 to 14 has the advantage over that illustrated in Figures 17 and 18 in that the dedendum rotors may be made from a one piece blank and the end discs 310 may be integrally machined thereon. Also it should be noted that when the rotor teeth of a dedendum rotor 312 are machined by the hobbing apparatus, of Figures 12–14, it is necessary that the short lead portion of the helical hob teeth be longer than the corresponding portion of the addendum teeth 314. This is necessary because, as illustrated, the teeth of the dedendum rotor 312 extend beyond the teeth of the addendum rotor 314. In addition the blank from which the rotor 312 is machined must project beyond the hob in order to leave the end disc 310.

Any of the dedendum rotors may be lightened by making their teeth hollow, as illustrated by dedendum rotors 134 and 280. For this purpose, helically disposed hollows 320 are cut in a cylindrical blank or central portion 322 to form the hollow portions of the dedendum rotor teeth, see Figure 21. The helical curves defined by the hollows 320 on the blank 322, must have the same lead as the dedendum teeth to be cut on said blank. Preferably the helically disposed hollows 320 are not continuous but spaced ribs 324 are left or formed thereacross to strengthen the side walls of the dedendum teeth. After these hollows have been formed, a thin cylindrical sleeve 326 is secured over the cylindrical blank 322—for example, by brazing, thereby enclosing said hollows 320 to form the hollow portion of the rotor teeth. Figure 21 illustrates a portion of a cylindrical blank 322 with said hollows 320 cut therein, and in addition a sleeve 326 is disposed adjacent to said blank in position to be slid thereover. The blank 322 with its sleeve 326 secured thereover can then be machined so as to form its helical dedendum tooth spaces between said lightening hollows 320 by any of the above discussed means for cutting said teeth, thereby completing the dedendum rotor.

Figure 22 is an elevational view of a portion of such a completed dedendum rotor 134 and illustrating its hollows 320 together with their strengthening ribs 324. These ribs 324 are also illustrated in Figure 10 since the section of the side rotor 134 in Figure 10 is taken approximately along the line 10—10 of Figure 22. The dedendum rotor 134 illustrated in section in Figure 9 has been provided with hollow teeth 138, as described, but for simplicity the ribs 324 have been omitted from Figure 9.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. Apparatus of the class described comprising a first rotor having helical teeth thereon; one or more second rotors disposed adjacent to said first rotor and having helical teeth thereon in mesh with the teeth of said first rotor; the teeth of said first rotor being all-addendum and the teeth of said one or more second rotors being all-dedendum to form a continuous seal line between each pair of meshing rotors, said helical teeth having a relatively long constant lead on one side of a plane disposed transversely across said first rotor and having a relatively short constant lead on the other side of said plane; and a tubular housing fitted about said rotors; the number of said rotors and the number of helical teeth on each rotor being such that $T_a = (T_d \times N_d) - N_d$ and $T_d/T_a$ is substantially less than unity where $T_a$ is equal to the number of teeth on the single addendum rotor, $T_d$ is equal to the number of teeth on each dedendum rotor and $N_d$ is equal to the number of dedendum rotors.

2. Apparatus of the class described comprising a first rotor having helical teeth thereon; one or more second rotors disposed adjacent to said first rotor and having helical teeth thereon in mesh with the teeth of said first rotor; the teeth of said first rotor being all dedendum and the teeth of said one or more second rotors being all addendum to form a continuous seal line between the meshing rotors, said helical teeth having a relatively long constant lead on one side of a plane disposed transversely across said first rotor and having a relatively short constant lead on the other side of said plane; and a tubular housing fitted about said rotors; the number of said rotors and the number of helical teeth on each rotor being such that $T_d = (T_a \times N_a) + N_a$ and the value of the expression $(T_a/T_d + 1/T_d)$ is substantially less than unity where $T_a$ is equal to the number of teeth on each addendum rotor, $T_a$ is equal to the number of teeth on the single dedendum rotor and $N_a$ is equal to the number of addendum rotors.

3. Apparatus of the class described comprising a first rotor having four helical teeth thereon; four rotors disposed about said first rotor; said four rotors each having two helical teeth thereon in mesh with the teeth of said first rotor; said helical teeth being shaped to form a continuous seal line between each pair of meshing rotors; and a tubular housing fitted about said helically toothed rotors to form fluid spaces therebetween, the lead of said helical teeth changing abruptly at a plane passing transversely across said rotors intermediate the ends of the rotors.

4. Apparatus of the class described comprising a first rotor having four helical teeth thereon; four rotors disposed about said first rotor; said four rotors each having two helical teeth thereon in mesh with the teeth of said first rotor; said helical teeth being shaped to form a continuous seal line between each pair of meshing rotors; and a tubular housing fitted about said helically toothed rotors to form fluid spaces therebetween; the helical lead of said teeth being smaller at one end of said rotors than at the other end.

5. Apparatus of the class described comprising a first rotor having four helical teeth thereon; four rotors disposed about said first rotor; said four rotors each having two helical teeth thereon in mesh with the teeth of said first rotor; said helical teeth being shaped to form a continuous seal line between each pair of meshing rotors; and a tubular housing fitted about said helically toothed rotors to form fluid spaces therebetween; the helical lead of said teeth being smaller at one end of said rotors than at the other end; said housing having a fluid inlet continuously communicating with all of said spaces at one end of said housing and having a fluid outlet continuously communicating with all of said spaces at the other end of said housing.

6. Apparatus of the class described comprising a first rotor having four helical teeth thereon; four rotors disposed about said first rotor; said four rotors each having two helical teeth thereon in mesh with the teeth of said first rotor; the teeth of said first rotor being all addendum and the teeth of said other rotors being all dedendum to form a continuous seal line between each pair of meshing rotors; and a tubular housing fitted about said helically toothed rotors to form fluid spaces between said rotors and housing; said housing having a fluid inlet continuously communicating with all of said spaces at one end of said housing and having a fluid outlet continuously communicating with all of said spaces at the other end of said housing; the lead of said helical teeth changing abruptly at a plane passing transversely across said housing intermediate the ends of said housing.

7. Apparatus of the class described comprising a pair of side-by-side rotors; one of said rotors having helical teeth of all-dedendum profile disposed in meshing engagement with helical teeth of all-addendum profile on the other of said rotors; said helical teeth being continuous along their respective rotors and having a long lead at one end of said apparatus and a short lead at the other end of said apparatus; said dedendum rotor, at said other end, extending beyond the adjacent end of said addendum rotor; and a cylindrical disc rigid with said dedendum rotor across its said other end; said disc having a diameter substantially larger than the root diameter of said dedendum teeth.

8. A rotor having hollow helical all-dedendum teeth; said rotor comprising a central cylindrical portion having hollows formed therein along helical paths disposed between said helical rotor teeth and of the same lead as said rotor teeth; and a cylindrical sleeve fitted about said central portion to enclose said hollows, the profiles of said rotor teeth extending inwardly through said sleeve into said central portion between the helical paths along which said hollows are disposed.

9. Apparatus of the class described comprising a first rotor having helical teeth thereon; a plurality of second rotors disposed about said first rotor and having helical teeth thereon meshing with the teeth of said first rotor, said helical teeth having a relatively long constant lead on one side of a plane disposed transversely across said first rotor and having a relatively short constant lead on the other side of said plane and each meshing pair of said helical teeth comprising a substantially all-addendum tooth and a substantially all-dedendum tooth with all the teeth on said first rotor being the same and all the teeth on said second rotors being the same; a tubular housing fitted about said rotors to form fluid spaces between said rotors and housing; a fluid inlet continuously communicating with all said fluid spaces at one end of said housing; and a fluid outlet continuously communicating with all said fluid spaces at the other end of said housing, the number of said rotors and the number of helical teeth on each rotor being such as to satisfy the equation, $$T_c = (T_s \times N_s) - N_s(1 - 2A)$$

where $T_c$ is equal to the number of teeth on said first rotor, $T_s$ is equal to the number of teeth on each of said second rotors, $N_s$ is equal to the number of said second rotors, and $A$ is equal to zero when said first rotor has all-addendum teeth and is equal to unity when said first rotor has all-dedendum teeth whereby said teeth partition said fluid spaces into closed fluid pockets which, upon rotation of said rotors, move from the inlet to the outlet end of said housing, the number of said rotors and the number of helical teeth on each rotor being further limited such that the ratio, $$\frac{T_s + A}{T_c}$$

is substantially less than unity whereby the axial length of said pockets is substantially less than the lead of the adjacent portion of the helical teeth of said first rotor.

10. Apparatus as recited in claim 9 in which the length of said rotors and the portion of said housing fitted about said rotors is such that each said pocket remains in communication with said fluid inlet until after the leading edge of said pocket has passed beyond said plane.

11. Apparatus of the class described comprising a first rotor having all-addendum helical teeth thereon; a plurality of second rotors disposed alongside of and about said first rotor and having all-dedendum helical teeth meshing with the teeth of said first rotor, said helical teeth having a relatively long constant lead on one side of a plane disposed transversely across said first rotor and having a relatively short constant lead on the other side of said plane; a tubular housing fitted across the rotor teeth to form fluid spaces between said rotors and housing; a fluid inlet continuously communicating with all said fluid spaces at one end of said housing; and a fluid outlet continuously communicating with all said fluid spaces at the other end of said housing; the number of said rotors and the number of helical teeth on each rotor being such as to satisfy the equation $$T_a = (T_d \times N_d) - N_d$$

where $T_a$ is equal to the number of teeth on the addendum rotor, $T_d$ is equal to the number of teeth on each dedendum rotor and $N_d$ is equal to the number of said dedendum rotors whereby said teeth partition said fluid spaces into fluid pockets which upon rotor rotation move from the inlet to the outlet of said housing, the length of said rotors and length of the portion of said housing fitted across the rotor teeth being such that each said pocket remains in communication with said fluid inlet until after the leading edge of said pocket has passed beyond said plane, and the number of said rotors and the number of helical teeth on each rotor being further limited such that the ratio $$\frac{T_d}{T_a}$$

is substantially less than unity whereby the axial length of each said pocket is substantially less than the lead of the adjacent portion of the helical teeth of said first rotor.

12. Apparatus of the class described comprising a first rotor having all-dedendum teeth thereon; a plurality of second rotors disposed alongside of and about said first rotor and having all addendum helical teeth meshing with the teeth of said first rotor, said helical teeth having a relatively long constant lead on one side of a plane disposed transversely across said first rotor and having a relatively short constant lead on the other side of said plane; a tubular housing fitted across the rotor teeth to form fluid spaces between said rotors and housing; a fluid inlet continuously communicating with all said fluid spaces at one end of said housing; and a fluid outlet continuously communicating with all said fluid spaces at the other end of said housing; the number of said rotors and the number of helical teeth on each rotor being such as to satisfy the equation $$T_d = (T_a \times N_a) + N_a$$

where $T_a$ is equal to the number of teeth on each addendum rotor, $T_d$ is equal to the number of teeth on the dedendum rotor and $N_a$ is equal to the number of addendum rotors whereby said teeth partition said fluid spaces into fluid pockets which upon rotor rotation move from the inlet to the outlet of the housing, the length of said rotors and length of the portion of said housing fitted across the rotor teeth being such that each said pocket remains in communication with said fluid inlet until after the leading edge of said pocket has passed beyond said plane, and the number of said rotors and the number of helical teeth on each rotor being further limited such that the ratio $$\frac{T_a + 1}{T_d}$$

is substantially less than unity whereby the axial length of said pockets is substantially less than the lead of the adjacent portion of the helical teeth of said first rotor.

ROLAND CHILTON.

References Cited in the file of this patent

UNITED STATES PATENTS

| Number | Name | Date |
|---|---|---|
| 281,819 | Albro | July 24, 1883 |
| 630,648 | Brewer | Aug. 8, 1899 |
| 1,470,507 | Steenstrup | Oct. 9, 1923 |
| 1,610,995 | Bostock et al. | Dec. 14, 1926 |
| 1,738,994 | Gredell | Dec. 10, 1929 |
| 1,744,757 | Ferguson | Jan. 28, 1930 |
| 1,818,492 | McFarland | Aug. 11, 1931 |
| 1,918,861 | Montelius | July 18, 1933 |
| 2,079,083 | Montelius | May 4, 1937 |
| 2,111,568 | Lysholm et al. | Mar. 22, 1938 |
| 2,273,050 | Kruse | Feb. 17, 1942 |
| 2,282,288 | Plensler | May 5, 1942 |
| 2,287,716 | Whitfield | June 23, 1942 |
| 2,325,617 | Lysholm et al. | Aug. 3, 1943 |
| 2,369,539 | Delamere | Feb. 13, 1945 |
| 2,414,790 | Barnard et al. | Jan. 28, 1947 |
| 2,441,771 | Lysholm | May 18, 1948 |

FOREIGN PATENTS

| Number | Country | Date |
|---|---|---|
| 74,114 | Sweden | Apr. 23, 1930 |
| 789,211 | France | Aug. 12, 1935 |
| 796,274 | France | Jan. 22, 1936 |
| 886,151 | France | June 28, 1943 |